US009575661B2

(12) United States Patent
Dor et al.

(10) Patent No.: US 9,575,661 B2
(45) Date of Patent: Feb. 21, 2017

(54) NONVOLATILE MEMORY SYSTEMS CONFIGURED TO USE DEDUPLICATION AND METHODS OF CONTROLLING THE SAME

(71) Applicant: Samsung Electronics Co., Ltd., Suwon-Si, Gyeonggi-Do (KR)

(72) Inventors: Avner Dor, Suwon-si (KR); Elona Erez, Suwon-si (KR); Jun Jin Kong, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 86 days.

(21) Appl. No.: 14/463,129

(22) Filed: Aug. 19, 2014

(65) Prior Publication Data
US 2016/0054930 A1 Feb. 25, 2016

(51) Int. Cl.
G06F 3/06 (2006.01)
G06F 17/30 (2006.01)
G06F 11/14 (2006.01)

(52) U.S. Cl.
CPC .......... G06F 3/0608 (2013.01); G06F 3/0641 (2013.01); G06F 3/0679 (2013.01); G06F 17/30159 (2013.01); G06F 11/1453 (2013.01)

(58) Field of Classification Search
CPC .. G06F 3/0641; G06F 3/0608; G06F 11/1453; G06F 17/30159; G06F 3/0679
See application file for complete search history.

(56) References Cited

U.S. PATENT DOCUMENTS

| 7,139,864 | B2 | 11/2006 | Bennett et al. |
| 7,702,683 | B1 | 4/2010 | Kirshenbaum |
| 7,814,078 | B1 * | 10/2010 | Forman ............. G06F 17/30486 707/698 |
| 7,827,179 | B2 | 11/2010 | Kusui et al. |
| 8,095,766 | B2 | 1/2012 | Liu et al. |
| 8,290,918 | B1 * | 10/2012 | Ioffe ................... G06F 17/3002 707/698 |
| 9,436,558 | B1 * | 9/2016 | Per ..................... G06F 11/1451 |
| 2010/0030998 | A1 | 2/2010 | Kiriansky |

(Continued)

FOREIGN PATENT DOCUMENTS

GB WO 2013178286 A1 * 12/2013 ........... G06K 9/6282

Primary Examiner — Yong Choe
Assistant Examiner — Glenn Gossage
(74) Attorney, Agent, or Firm — Harness, Dickey & Pierce, P.L.C.

(57) ABSTRACT

Systems and methods of determining a similarity between data units in a nonvolatile memory are disclosed. One method includes obtaining first and second data units and dividing the first and second data units into a first plurality of non-overlapping chunks of data and a second plurality of non-overlapping chunks of data. The method further includes determining a first plurality of values and a second plurality of values associated with the chunks, and determining a similarity between the first second data units based on the first plurality values and of the second plurality of values. In one example embodiment, a similarity between an incoming data unit and another data unit is determined based on the number of buckets storing an incoming index value and another index value associated with the another data unit. A plurality of buckets in a table is determined based on a selected plurality of hash values.

14 Claims, 12 Drawing Sheets

(56) References Cited

U.S. PATENT DOCUMENTS

| | | |
|---|---|---|
| 2010/0223429 A1 | 9/2010 | Cher et al. |
| 2010/0281208 A1 | 11/2010 | Yang |
| 2011/0099351 A1 | 4/2011 | Condict |
| 2011/0276744 A1 | 11/2011 | Sengupta et al. |
| 2012/0023112 A1 | 1/2012 | Levow et al. |
| 2012/0117080 A1* | 5/2012 | Lamanna ............ G06F 17/30613 707/747 |
| 2012/0137045 A1 | 5/2012 | Bacher et al. |
| 2012/0158709 A1* | 6/2012 | Gaonkar ............ G06F 17/30156 707/723 |
| 2012/0233135 A1 | 9/2012 | Tofano |
| 2012/0260060 A1* | 10/2012 | Hwang ............... G06F 12/0238 711/216 |
| 2013/0018855 A1* | 1/2013 | Eshghi ................ G06F 11/1453 707/692 |
| 2014/0188822 A1* | 7/2014 | Das .................... H03M 7/3091 707/693 |
| 2014/0279954 A1* | 9/2014 | Aronovich ........ G06F 17/30371 707/692 |

\* cited by examiner

NONVOLATILE MEMORY SYSTEMS CONFIGURED TO USE DEDUPLICATION AND METHODS OF CONTROLLING THE SAME

BACKGROUND

A volatile memory device loses stored data when the supply of power is interrupted. Examples of a volatile memory device include a static random access memory (static RAM or SRAM), a dynamic RAM (DRAM), a synchronous DRAM (SDRAM), etc. A nonvolatile memory device retains stored data even when the supply of power is interrupted. Examples of a nonvolatile memory device include a read only memory (ROM), a programmable ROM (PROM), an erasable programmable ROM (EPROM), an electrically erasable programmable ROM (EEPROM), a flash memory device, a phase-change RAM (PRAM), a magnetic RAM (MRAM), a resistive RAM (RRAM or ReRAM), a ferroelectric RAM (FRAM), etc.

SUMMARY

Example embodiments include methods and/or apparatuses for controlling nonvolatile memory devices. In at least some example embodiments, a method detects a similarity of pairs of data units (e.g., sectors or pages) using deduplication.

At least one example embodiment is directed to a method of determining a similarity in a nonvolatile memory system. The method includes receiving an incoming data unit, assigning an incoming index value to the incoming data unit, dividing the incoming data unit into a plurality of chunks, the incoming data unit represented by a vector of the plurality of chunks, determining an incoming plurality of hash values of the plurality of chunks based on a hash function, determining a selected plurality of hash values from the incoming plurality of hash values, determining a plurality of buckets in a table based on the selected plurality of hash values, each of the plurality of buckets associated with a different one of the selected plurality of hash values, storing the incoming index value in at least one of the plurality of buckets, determining a number of buckets in the plurality of buckets storing the incoming index value and at least another index value associated with at least another data unit, and determining a similarity between the incoming data unit and the at least another data unit based on the determined number.

In an example embodiment, the incoming data unit is one of a sector and a page.

In an example embodiment, a number of the plurality of chunks is the number of cells in a sector divided by an average size of the plurality of chunks.

In an example embodiment, the selected plurality of hash values includes all of the incoming plurality of hash values.

In an example embodiment, determining the selected plurality of hash values includes determining a first possible value for the hash function, determining a threshold based on a product of the first possible value and a constant factor, and determining the selected plurality of hash values based on the incoming plurality of hash values that exceed the threshold.

In an example embodiment, determining the similarity determines the similarity based on whether the determined number exceeds a threshold number.

In an example embodiment, the threshold number is one.

In an example embodiment, the method further includes writing the incoming data unit into a physical page of a nonvolatile memory based on the similarity, the writing including writing a reference page having different chunks of the plurality of chunks, and writing a difference between the incoming data unit and the at least another data unit.

In an example embodiment, the nonvolatile memory is a flash device.

In an example embodiment, the flash device is a NAND flash device.

In an example embodiment, determining the similarity determines the similarity independent of positions of the plurality of chunks in the incoming data unit.

In an example embodiment, the plurality of chunks are non-overlapping.

At least one example embodiment is directed to a method of determining a similarity in a nonvolatile memory system. The method includes obtaining first and second data units, the first data unit divided into a first plurality of non-overlapping chunks of data and the second data unit divided into a second plurality of non-overlapping chunks of data, determining a first plurality of values associated with the first plurality of chunks and a second plurality of values associated with the second plurality of chunks, and determining a similarity between the first data unit and the second data unit based on whether a number of the first plurality of values equals a number of the second plurality of values.

In an example embodiment, determining the similarity determines the similarity independent of positions of the first and second pluralities of non-overlapping chunks in the obtained data units.

In an example embodiment, determining the first plurality of values and the second plurality of values includes using a hash function to determine the first plurality of values and the second plurality of values, the first plurality of values and the second plurality of values being hash values.

In an example embodiment, the method further includes determining a plurality of buckets in a table based on the first plurality of values and the second plurality of values, each of the plurality of buckets associated with a different possible hash value and determining a number of buckets in the plurality of buckets associated with both at least one of the first plurality of values and at least one of the second plurality of values.

In an example embodiment, determining the similarity determines the similarity based on the determined number of buckets.

In an example embodiment, each of the first and second data units is one of a sector and a page.

At least one example embodiment is directed to a memory system including a nonvolatile memory device and a memory controller configured to receive an incoming data unit, assign an incoming index value to the incoming data unit, divide the incoming data unit into a plurality of chunks, the incoming data unit represented by a vector of the plurality of chunks, determine an incoming plurality of hash values of the plurality of chunks based on a hash function, determine a selected plurality of hash values from the incoming plurality of hash values, determine a plurality of buckets in a table based on the selected plurality of hash values, each of the plurality of buckets associated with a different one of the selected plurality of hash values, store the incoming index value in at least one of the plurality of buckets, determine a number of buckets in the plurality of buckets storing the incoming index value and at least another index value associated with at least another data unit, and determine a similarity between the incoming data unit and the at least another data unit based on the determined number.

In an example embodiment, the incoming data unit is one of a sector and a page.

In an example embodiment, a number of the plurality of chunks is the number of cells in a sector divided by an average size of the plurality of chunks.

In an example embodiment, the selected plurality of hash values includes all of the incoming plurality of hash values.

In an example embodiment, the memory controller is configured to determine a first possible value for the hash function, determine a threshold based on a product of the first possible value and a constant factor, and determine the selected plurality of hash values based on the incoming plurality of hash values that exceed the threshold.

In an example embodiment, the memory controller is configured to determine the similarity based on whether the determined number exceeds a threshold number.

In an example embodiment, the threshold number is one.

In an example embodiment, the memory controller is further configured to write the incoming data unit into a physical page of the nonvolatile memory device based on the similarity, the writing including writing a reference page having different chunks of the plurality of chunks and writing a difference between the incoming data unit and the at least another data unit.

In an example embodiment, the nonvolatile memory is a flash device.

In an example embodiment, the flash device is a NAND flash device.

In an example embodiment, the memory controller is configured to determine the similarity independent of positions of the plurality of chunks in the incoming data unit.

In an example embodiment, the plurality of chunks are non-overlapping.

At least one example embodiment is directed to a memory system including a nonvolatile memory device and a memory controller configured to obtain first and second data units, the first data unit divided into a first plurality of non-overlapping chunks of data and the second data unit divided into a second plurality of non-overlapping chunks of data, determine a first plurality of values associated with the first plurality of chunks and a second plurality of values associated with the second plurality of chunks, and determine a similarity between the first data unit and the second data unit based on whether a number of the first plurality of values equals a number of the second plurality of values.

In an example embodiment, the memory controller is configured to determine the similarity independent of positions of the first and second pluralities of non-overlapping chunks in the obtained data units.

In an example embodiment, the memory controller is configured to use a hash function to determine the first plurality of values and the second plurality of values, the first plurality of values and the second plurality of values being hash values.

In an example embodiment, the memory controller is configured to determine a plurality of buckets in a table based on the first plurality of values and the second plurality of values, each of the plurality of buckets associated with a different possible hash value, and determine a number of buckets in the plurality of buckets associated with both at least one of the first plurality of values and at least one of the second plurality of values.

In an example embodiment, the memory controller is configured to determine the similarity based on the determined number of buckets.

In an example embodiment, each of the first and second data units is one of a sector and a page.

BRIEF DESCRIPTION OF THE DRAWINGS

Example embodiments will become more appreciable through the description of the drawings in which.

DETAILED DESCRIPTION

Figure 1:
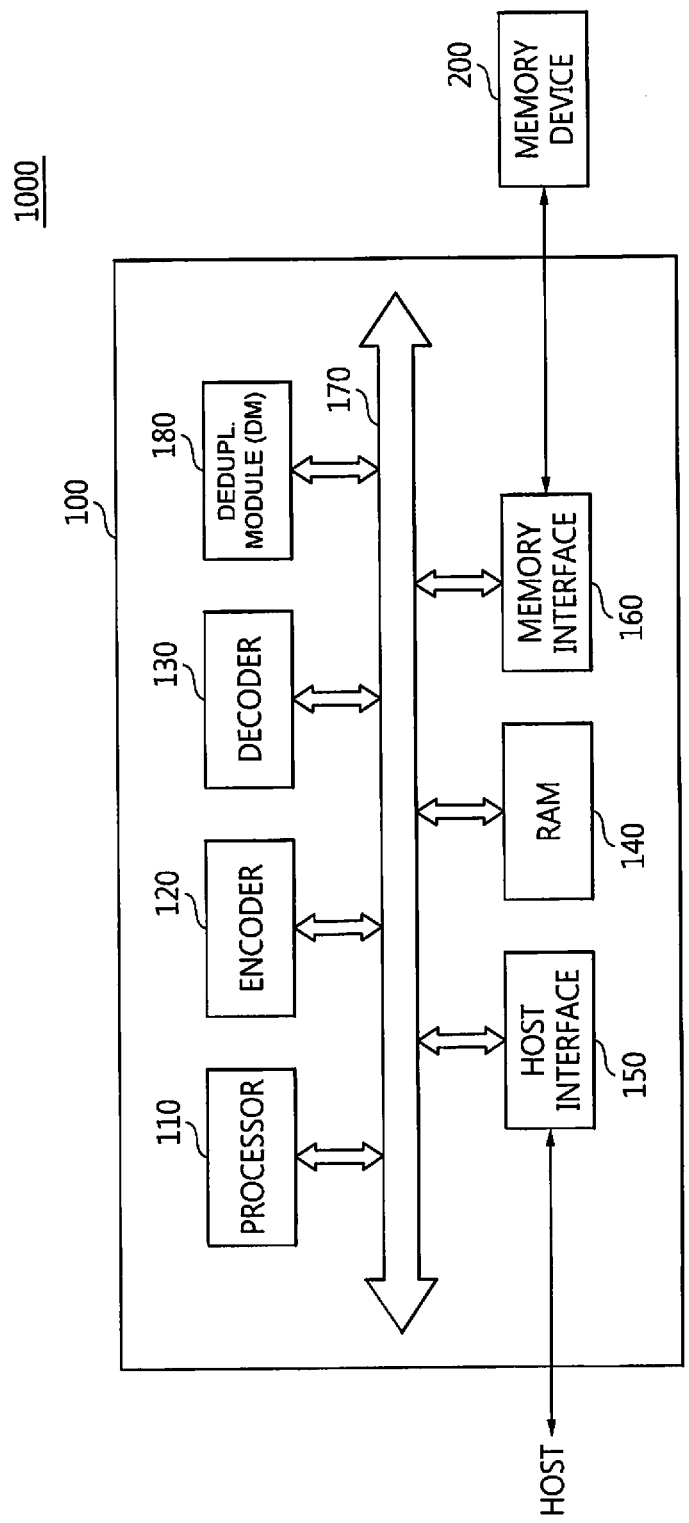
FIG. 1 is a block diagram of a memory system according to an example embodiment.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types and may be implemented using existing hardware in existing electronic systems (e.g., nonvolatile memories, universal flash memories, universal flash memory controllers, nonvolatile memories and memory controllers, digital point-and-shoot cameras, personal digital assistants (PDAs), smartphones, tablets, personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 is a block diagram of a memory system 1000 according to an example embodiment of inventive concepts.

As shown in FIG. 1, the memory system 1000 includes a memory controller 100 and a memory device 200. The controller 100 may be hardware, firmware, hardware executing software or any combination thereof. When the device controller 100 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the memory controller 100, such as a processor 110. CPUs, DSPs, ASICs and FPGAs may generally be referred to as processors and/or microprocessors.

In the event that the controller 100 is a processor executing software, the processor is configured as a special purpose machine by executing the software to perform the functions of the controller 100. In such an embodiment, the controller 100 may include one or more Central Processing Units (CPUs), digital signal processors (DSPs), application-specific-integrated-circuits (ASICs), field programmable gate arrays (FPGAs) computers.

The memory device 200 may be a non-volatile memory device. For example, the memory device 200 may be a flash memory device, a phase change random access memory (PRAM), a ferroelectric RAM (FRAM), or a magnetic RAM (MRAM) device. The memory device 200 may be configured to include at least one non-volatile memory device and at least one volatile memory device, or at least two or more kinds of non-volatile memory devices.

In addition, the memory device 200 may be configured as a single flash memory chip, or multiple flash memory chips. The flash memory chips may be NAND flash memory chips.

The memory controller 100 includes a processor 110, an encoder 120, a decoder 130, a RAM 140, a host interface 150, a memory interface 160, a bus 170 and a deduplication module (DM) 180.

In one embodiment, the processor 110 is electrically connected to the encoder 120, the decoder 130, the RAM 140, the host interface 150, the deduplication module 180 and the memory interface 160 via the bus 170.

The bus 170 denotes a transfer path through which information is transferred between elements of the memory controller 100.

The processor 110 controls overall operations of the memory system 1000. In particular, the processor 110 reads commands transmitted from a host and controls the memory system 1000 to perform an operation according to the read result.

The processor 110 provides the memory device 200 with a read command and an address during a reading operation, and provides the memory device 200 with a write command, an address, and an encoded codeword during a writing operation. In addition, the processor 110 converts a logical address received from the host into a physical page address by using metadata stored in the RAM 140.

The RAM 140 temporarily stores data transmitted from the host and data generated by the processor 110, or data read out from the memory device 200. Also, the RAM 140 may store metadata read out from the memory device 200. The RAM 140 may be a DRAM or an SRAM.

Metadata is information generated by the memory system 1000 in order to manage the memory device 200. The metadata, that is, managing information, includes mapping table information that is used to convert logical addresses into physical page addresses of the memory device 200. For example, the metadata may include page mapping table information that is used to perform an address mapping process per page unit. Also, the metadata may include information for managing storage of the memory device 200.

The host interface 150 includes a protocol for data exchange with a host connected to the memory device 200, and connects the memory device 200 and the host to each other. The host interface 150 may be realized as an advanced technology attachment (ATA) interface, a serial advanced technology attachment (SATA) interface, a parallel ATA (PATA) interface, a universal serial bus (USB) interface or a serial attached SCSI (SAS) computer system interface, a small computer system interface (SCSI), embedded multimedia card (eMMC) interface, or a unix file system (UFS) interface. However, inventive concepts are not limited to the above examples. In particular, the host interface 150 may exchange commands, addresses, and data with the host according to control of the processor 110.

The memory interface 160 is electrically connected to the memory device 200. The memory interface 160 may interface with a NAND flash memory chip or a NOR flash memory chip. The memory interface 160 may be configured so that software and hardware interleaved operations may be selectively performed via a plurality of channels.

The processor 110 controls the memory system 1000 to read the metadata stored in the memory device 200 and store the metadata in the RAM 140, when electric power is supplied to the memory system 1000. The processor 110 controls the memory system 1000 to update the metadata stored in the RAM 140 according to an operation of generating metadata change in the memory device 200. In addition, the processor 110 controls the memory system 1000 to write the metadata stored in the RAM 140 in the memory device 200 before the memory system 1000 is turned off (POWER OFF).

The processor 110 controls the memory controller 100 to perform an encoding process of information words transmitted from the host in the encoder 120 during the writing operation, and to perform a decoding process of the data read from the memory device 200 in the decoder 130 during the reading operation.

The processor 110 also controls the deduplication module 180 to perform the deduplication and similarity measurements as will be described in greater detail below with respect to FIG. 6.

Figure 2:
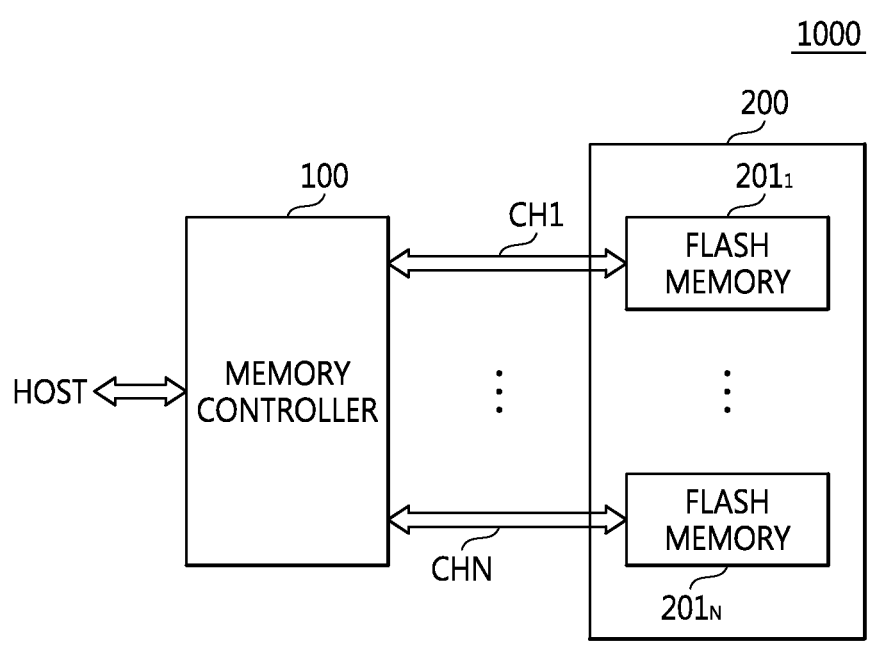
FIG. 2 is a block diagram of a memory system forming a plurality of channels by configuring a memory device shown in FIG. 1 with a plurality of memory chips.

FIG. 2 is a block diagram of a memory system 1000 forming a plurality of channels by configuring the memory device 200 shown in FIG. 1 with a plurality of memory chips.

Referring to FIG. 2, the memory device 200 includes a plurality of flash memory chips $201_1$-$201_N$.

The memory system 1000 includes first through N-th channels CH1-CHN (N is a natural number) and each of the channels may include a number of flash memory chips. The number of flash memory chips included in each of the channels may vary.

The memory controller 100 of FIG. 2 is substantially the same as the memory controller 100 of FIG. 1, and detailed descriptions thereof are not provided here.

A plurality of flash memory chips $201_1$-$201_N$ may be electrically connected to each of the channels CH1 through CHN. Each of the channels CH1 through CHN may denote an independent bus that may transmit/receive commands, addresses, and data to/from the corresponding flash chips $201_1$-$201_N$. The flash memory chips connected to different channels may operate independently from each other. The plurality of flash memory chips $201_1$-$201_N$ connected to the channels CH1 through CHN may form a plurality of ways way1 through wayM. M number of flash memory chips may be connected to the M ways formed with respect to each of the channels CH1 through CHN.

For example, flash memory chips 201 may configure M ways way1 through wayM in the first channel CH1. Flash memory chips 201-1 through 201-M may be connected respectively to the M ways way1 through wayM in the first channel CH1. Such relationships between the flash memory chips and the ways may be applied to other flash memory chips.

The way is a unit for distinguishing the flash memory chips sharing the same channel. Each of the flash memory chips may be identified according to the channel number and the way number. It may be determined which flash memory chip performs the request provided from the host according to the logical address transmitted from the host.

Figure 3:
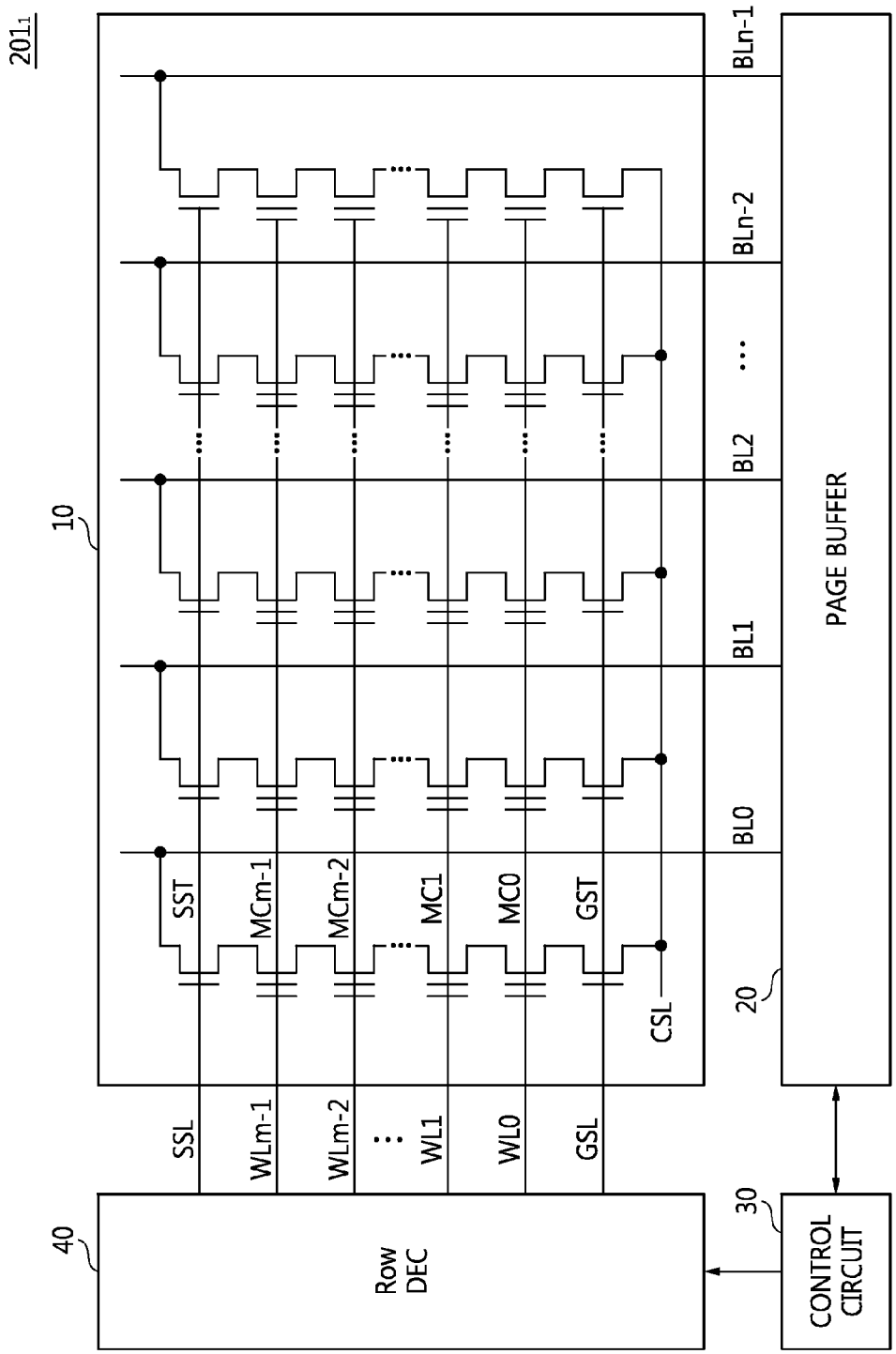
FIG. 3 is a diagram showing a circuit configuration of a flash memory chip according to an example embodiment.

FIG. 3 is a diagram showing a circuit configuration of one flash memory chip $201_1$ forming the memory device 200.

As shown in FIG. 3, the flash memory chip $201_1$ may include a cell array 10, a page buffer 20, a control circuit 30, and a row decoder 40.

The cell array 10 is an area in which data is written by applying a voltage to a transistor. The cell array 10 includes memory cells formed on points where word lines WL0 through WLm-1 and bit lines BL0 through BLn-1 cross each other. Here, m and n are natural numbers. In FIG. 3, only one memory block is shown; however, the cell array 10 may include a plurality of memory blocks. Each of the memory blocks includes a page corresponding to each of the word lines WL0 through WLm-1. In addition, each page may include a plurality of memory cells connected to the corresponding word line. The flash memory chip $201_1$ performs an erasing operation with respect to each memory block, and performs a programming operation or a reading operation with respect to each page.

The memory cell array 10 has a cell string structure. Each of cell strings includes a string selection transistor (SST) connected to a string selection line (SSL), a plurality of memory cells MC0 through MCm-1 respectively connected to the plurality of word lines WL0 through WLm-1, and a ground selection transistor (GST) connected to a ground selection line (GSL). Here, the SST is connected between the bit line and a string channel, and the GST is connected between the string channel and a common source line (CSL).

The page buffer 20 is connected to the cell array 10 via the plurality of bit lines BL0 through BLn-1. The page buffer 20 temporarily stores data that will be written in the memory cells connected to the selected word line, or the data read from the memory cells connected to the selected word line.

The control circuit 30 generates various voltages for performing the programming operation or the reading operation, and the erasing operation, and controls overall operations of the flash memory chip $201_1$.

The row decoder 40 is connected to the cell array 10 via the SSL, the GSL, and the plurality of word lines WL0 through WLm-1. The row decoder 40 receives an address during the programming operation or the reading operation, and selects one of the word lines according to the input address. Here, the memory cells for performing the programming operation or the reading operation are connected to the selected word line.

Also, the row decoder 40 applies voltages for the programming operation or the reading operation (for example, a programming voltage, a pass voltage, a reading voltage, a string selection voltage, and a ground selection voltage) to the selected word line, non-selected word lines, and the selection lines (SSL and GSL).

Each of the memory cells may store data of one bit or two or more bits. The memory cell storing the data of one bit may be referred to as a single level cell (SLC). In addition, the memory cell storing the data of two or more bits may be referred to as a multi-level cell (MLC). The SLC is in an erase state or a program state according to a threshold voltage thereof.

Figure 4:
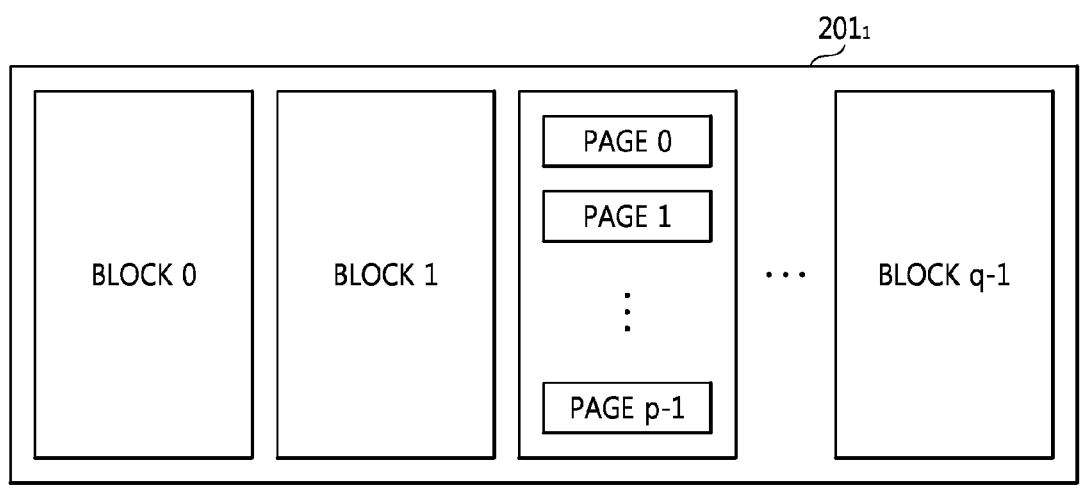
FIG. 4 illustrates a flash memory chip including a plurality of blocks according to an example embodiment.

As shown in FIG. 4, the flash memory chip $201_1$ includes a plurality of blocks therein, and each of the blocks includes a plurality of pages.

In the flash memory chip $201_1$, the writing and reading of the data is performed per page unit, and an electric erasing is performed per block unit. In addition, the electric erasing operation of the block has to be performed before performing the writing operation. Accordingly, overwriting may not be possible.

In the memory device that is not capable of performing the overwriting, the user data may not be written in a physical area desired by the user. Therefore, when the host requests access in order to write or read data, an address conversion operation for converting the logical address representing an area that is requested to write or read data into a physical page address representing a physical area actually storing the data, or that will store the data, is used.

Figure 5:
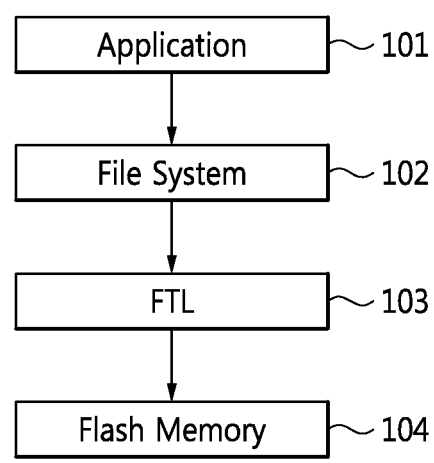
FIG. 5 illustrates a diagram of layers of the memory system shown in FIG. 1.

Referring to FIG. 5, the memory system 1000 has a software hierarchical structure including an application layer 101, a file system layer 102, a flash translation layer (FTL) 103, and a flash memory layer 104.

The application layer 101 denotes firmware processing data in response to the user input from the host. In the application layer 101, the user data is processed in response to the user input, and a command for storing the processed user data in a flash memory chip is transmitted to the file system layer 102. The application 101 indicates various application programs being driven in an external device (e.g., a host, application processor, etc.). For example, the application 101 includes various computing programs such as a text editor, a web browser, an image player, a game program, etc.

In the file system layer 102, a logical address in which the user data will be stored is allocated in response to the command transmitted from the application layer 101. A file allocation table system or NTFS (New Technology File System) may be used as the file system in the file system layer 102. For example, the file system 102 may include a file allocation table (FAT), a FAT32, a NTFS, a hierarchical file system (HFS), a journaled file system2 (JSF2), an extended file system (XFS), an on-disk structure-5 (ODS-5), a universal disk format (UDF), a zettabyte file system (ZFS), a UNIX file system (UFS), ext2, ext3, ext4, ReiserFS, Reiser4, ISO, 9660, Gnome, virtual file system (VFS), an encrypting file system (EFS) or Windows® Future Storage (WinFS).

The FTL 103 can provide an interface between the host and the nonvolatile memory device 200. In the FTL 103, the logical address transmitted from the file system layer 102 is converted to the physical page address for performing the writing/reading operations in the flash memory chip. In the FTL 103, the logical address may be converted into the physical page address by using mapping information included in the metadata.

In the flash memory layer 104, control signals for storing or reading data by accessing the physical page address converted from the logical address are generated.

Referring back to FIG. 1, the deduplication module 180, when executed by the processor 110, detects a similarity of pairs of data units (e.g., sectors or pages) in a NAND flash that contains a number of such units. The method and system allow for a fast preliminary procedure that finds similar data units. The method includes applying deduplication on each participating data unit which is characterized by chunks and hash indexing of the chunks. The algorithm places the indexes of each participating data unit in bins whose addresses are the hash values of the chunks of that data unit. Thus, the index of each data unit is generally placed in numerous bins. Each pair that appears in a number of buckets which is equal or larger than a threshold $T_0$ is considered similar. If the chunks are large size, the threshold $T_0$ may be 1. That is—one common chunk—may be an indication for similarity of two data units. The proposed process of coarse deduplication and matching can be followed by finer deduplication.

Figure 6:
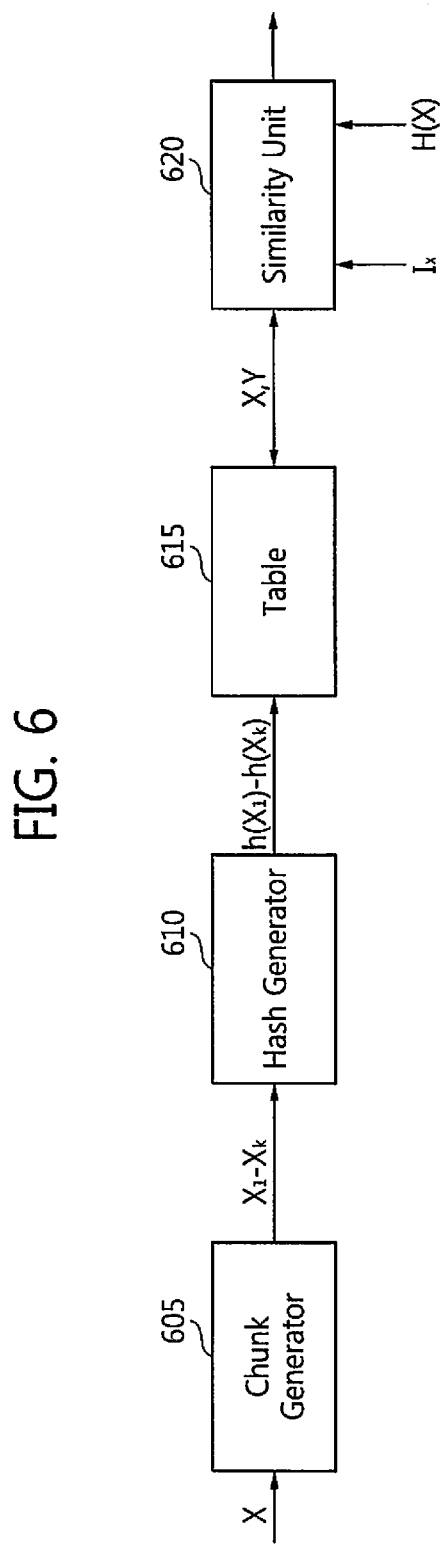
FIG. 6 illustrates a deduplication module, according to an example embodiment.

FIG. 6 illustrates the deduplication module 180, according to an example embodiment. As shown in FIG. 6, the deduplication module 180 includes a chunk generator 605, a hash generator 610, a table 615 and a similarity unit 620.

The chunk generator 605 receives a data unit X and assigns a unique index $I_X$ to the data unit X. Moreover, the chunk generator 605 generates chunks of the data unit $x_1$-$x_k$. The data unit may be a sector of size 4 KB or a page of size 8 KB, for example. The chunk generator 605 may partition the data unit X such that the chunks $x_1$-$x_k$ have different sizes.

Any known chunking algorithm can be applied. The chunking may or may not depend on the content of the data. For example, one well known algorithm for content dependent data that may be used is called "Rabin Fingerprinting," such as described in *Fingerprinting by Random Polynomi-*

*als*, by Michael O. Rabin, Technical report from The Hebrew University of Jerusalem and The Department of Computer Science at Harvard University, 1981, the entire contents of which are herein incorporated by reference.

The hash generator 610 receives the chunks $x_1$-$x_k$ and generates a hash value for each chunk $x_1$-$x_k$ of the data unit X by applying a hash function $h(x_i)$. The hash function $h(x_i)$ has a maximum value of M and is a random function which maps each chunk $x_1$-$x_k$ with a uniform distribution of $\{1, \ldots, M\}$. For the data unit X, the hash vector may be $H(X)=(h(x_1), \ldots, h(x_k))$.

The table 615 includes a plurality of buckets (bins). Each of the buckets in the table 615 corresponds to a hash value. For each hash value generated by the hash generator 610, the table 615 stores the unique index $I_X$ in the bucket associated with the hash value. For example, the table 615 stores the unique index $I_X$ of the data unit X in the buckets associated with the hash values $h(x_1)$-$h(x_k)$.

In another example embodiment, the table 615 may only include buckets whose associated hash values are greater than a threshold of $\rho*M$, where $\rho$ is a constant between 0 and 1. Consequently, chunks $x_1$-$x_k$ that generate a hash value below $\rho*M$ are disregarded and the size of the table 615 may be reduced. For example, $\rho$ may be 0.9.

Because data units may have chunks that are the same and because identical chunks generate the same hash value, the table 615 may include buckets that have more than one unique index. For example, a bucket may include the unique index $I_X$ corresponding to the data unit X and a unique index $I_Y$ corresponding to another data unit Y.

In FIG. 6, the similarity unit determines that data unit X and data unit Y have corresponding index values in at least one bucket of the table 615.

The similarity unit 620 determines the similarity of the data unit X with any other data unit (e.g., data unit Y) by monitoring the buckets in the table 615. For example, for each pair of data units, the similarity unit 620 determines whether the unique index values $I_X$, $I_Y$ for the data units, respectively, are in at least a threshold number of buckets. If the unique index values $I_X$, $I_Y$ are in at least the threshold number of buckets, the similarity unit 620 determines that the pair of data units are similar. In one embodiment, the threshold value may be one. However, it should be understood that the threshold value may be a value other than one.

To reduce the number of comparisons for a pair of data units, the similarity unit 620 may implement the threshold value $\rho*M$. In other words, the similarity unit 620 disregards buckets that are associated with hash values less than $\rho*M$. Therefore, for the data unit X, the similarity unit 620 constructs a vector $$L(X)=\{h(x_j):h(x_j)\geq(\rho*M)\}$$

For the data unit Y being compared to the data unit X, the similarity unit 620 computes the vector $L(Y)$.

The similarity unit 620 then sorts $L(X)$ with $r*\log 2(r)$ comparisons to obtain a sorted vector $L^*(X)$, where $$r=|L(X)|$$

The similarity unit 620 determines a sorted vector $L^*(Y)$ in the same manner as determining the sorted vector $L^*(X)$.

Using the sorted vectors $L^*(X)$ and $L^*(Y)$ the similarity unit 620 determines a similarity as follows:

$$m^*(X,Y)=|L^*(X)\cap L^*(Y)|$$

If the value of $m^*(X,Y)$ indicates that there are a number of hash values associated with both data units X and Y above the threshold, the similarity unit 620 may determine that X and Y are similar. As stated above, the threshold may be one or any other desired value.

Alternatively, the similarity unit 620 may determine a similarity by one of the following:

$$\mu=(X,Y)=|X^S\cup Y^S|=|X^S|+|Y^S|-|X^S\cap Y^S|$$

$$\mu(X,Y)=|X^S\cup Y^S|=|X^S|+|Y^S|-m^*(X,Y)/1-\rho$$

where $X^S$ is the set of values of X and $Y^S$ is the set of values of Y.

Similar to $m^*(X,Y)$, the similarity $\mu(X,Y)$ may be compared to the threshold by the similarity unit 620.

The similarity $m^*(X,Y)$ (or $\mu(X,Y)$) determined by the deduplication module 180 is used by the controller 100 to write logical pages into physical pages.

In an example, a buffer (e.g., in the RAM 140) may store four logical pages $A_1$, $A_2$, $A_3$ and $A_4$ to write into two physical pages. The controller 100 performs deduplication on the logical pages $A_1$, $A_2$, $A_3$ and $A_4$ to store two logical pages into one physical page, as shown in FIG. 7.

The deduplication module 180 determines a similarity $m^*(A_i,A_j)$ between each pair in the four logical pages: $A_1$-$A_2$, $A_1$-$A_3$, $A_1$-$A_4$, $A_2$-$A_3$, $A_2$-$A_4$ and $A_3$-$A_4$. The deduplication module 180 may determine the similarity using a page as the data unit size or by partitioning each page into sectors and using sectors as the data unit size. The similarity unit 620 then sends the similarity measurements $m^*(A_i,A_j)$ to the processor 110. Upon receiving the similarity measurements $m^*(A_i,A_j)$, the processor 110 determines which pair $A_i$-$A_j$ has the highest similarity. The processor 110 can then write the pair of logical pages $A_i$-$A_j$ into a single physical page.

Figure 7:
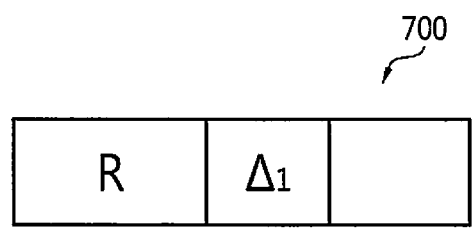
FIG. 7 illustrates one physical page that includes two logical pages, according to an example embodiment.

FIG. 7 illustrates one physical page that includes logical pages $A_i$ and $A_j$. A physical page 700 includes a reference page R and a difference $\Delta_1$.

The reference page R represents the chunks of the logical page $A_i$ that are also in the logical page $A_j$, while omitting repeating chunks. Any algorithm can be used for determining repeating chunks. A common method is using hash table.

The difference $\Delta_1$ represents a difference between the logical pages $A_i$ and $A_j$. In other words, the difference $\Delta_1$ includes chunks that appear in the logical page $A_i$, but do not appear in the logical page $A_j$ (or chunks that appear in the logical page $A_j$, but do not appear in the logical page $A_i$). The chunks in difference $\Delta_1$ are stored in the same physical page as the reference page R.

Figure 8:
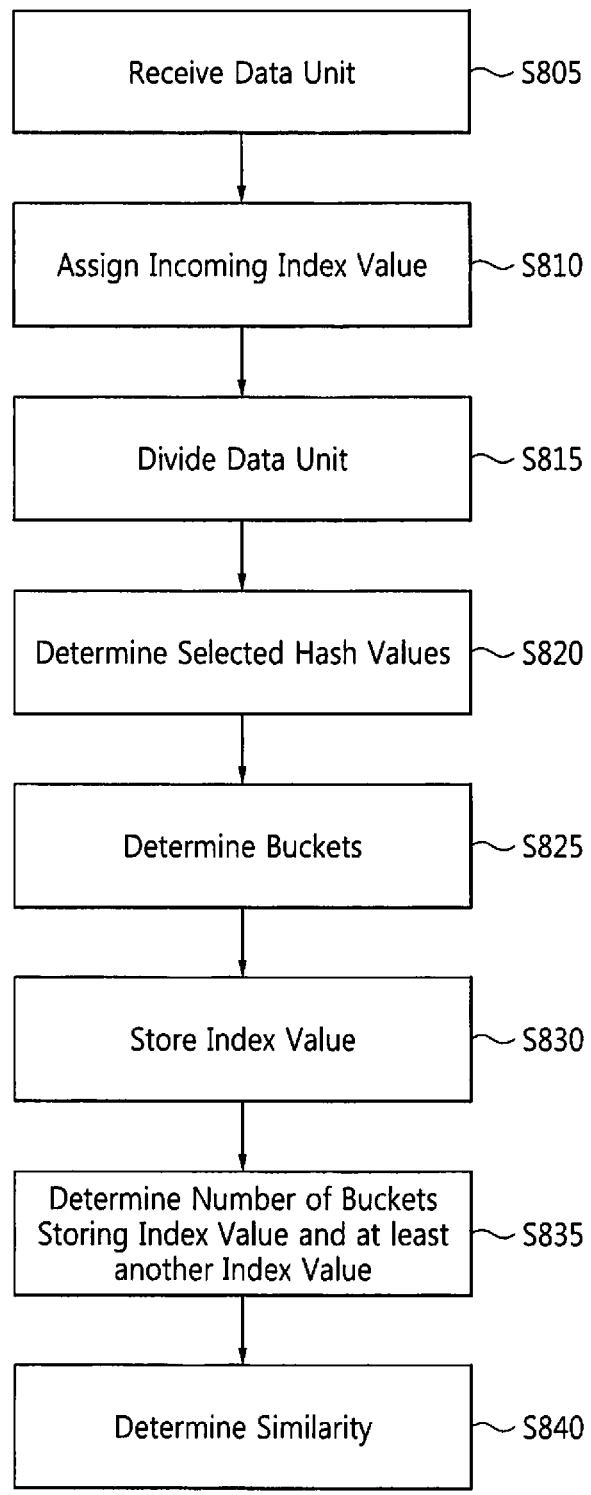
FIG. 8 illustrates a method of determining a similarity in a memory system, according to an example embodiment.
Figure 9:
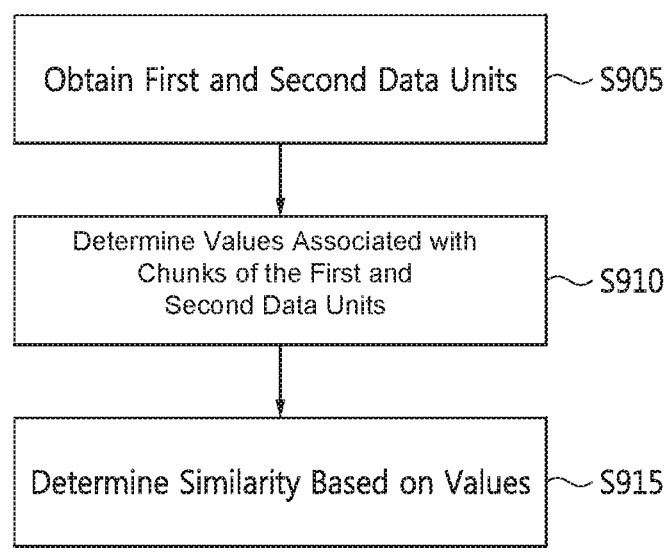
FIG. 9 illustrates a method of determining a similarity in a memory system, according to another example embodiment.

FIGS. 8 and 9 illustrate methods according to example embodiments. The methods may be performed by the memory system 1000, as described above.

More specifically, the methods of FIGS. 8 and 9 may be implemented by the processor 110 and the deduplication module 180, as described above.

At S805, the deduplication module 180 receives an incoming data unit (e.g., X). At S810, the deduplication module 180 assigns an incoming index value (e.g., $I_X$) to the incoming data unit. At S815, the deduplication module 180 divides the data unit into a plurality of chunks. At S820, the deduplication module 180 determines a selected plurality of hash values, which are a set of the plurality of hash values. For example, the selected plurality of hash values may be the hash values that exceed $\rho*M$.

At S825, the deduplication module 180 determines a plurality of buckets in a table based on the selected plurality of hash values. Each of the plurality of buckets is associated with a different one of the selected plurality of hash values.

At S830, the deduplication module 180 stores the incoming index value in the plurality of buckets. At S835, the deduplication module 180 determines a number of buckets in the plurality of buckets storing the incoming index value and at least another index value (e.g., $I_y$) associated with at least another data unit (e.g., Y). The deduplication module 180 then determines a similarity between the incoming data unit and the at least another data unit based on the determined number.

In FIG. 9, the deduplication module 180 obtains first and second data units, at S905. The first data unit is divided into a first plurality of non-overlapping chunks of data and the second data unit is divided into a second plurality of non-overlapping chunks of data.

At S910, the deduplication module 180 determines a first plurality of values associated with the first plurality of chunks and a second plurality of values associated with the second plurality of chunks.

At S915, the deduplication module 180 determines a similarity between the first data unit and the second data unit based on whether any of the first plurality of values equals any of the second plurality of values.

Figure 10:
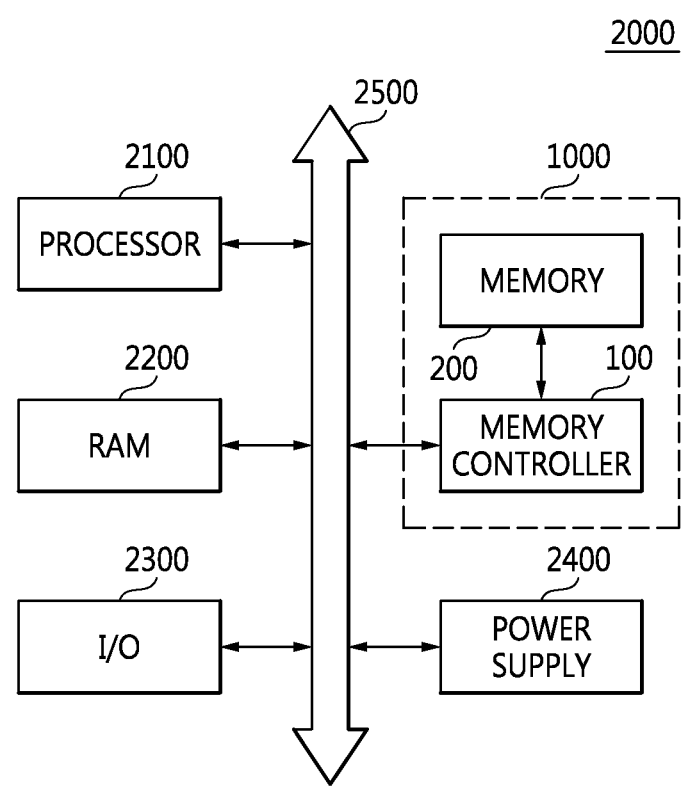
FIG. 10 is a block diagram of an electronic system adopting the memory system according to an example embodiment.

FIG. 10 is a block diagram of an electronic apparatus adopting a memory system according to an example embodiment of inventive concepts.

Referring to FIG. 10, an electronic apparatus 2000 includes a processor 2100, a random access-memory (RAM) 2200, an input/output device 2300, a power supply device 2400, and a memory system 1000. Although not shown in FIG. 10, the electronic apparatus 2000 may further include ports that may communicate with video cards, sound cards, or universal serial bus (USB) devices, or other electronic devices. The electronic device 2000 may be realized as a personal computer, or a portable electronic device such as a notebook computer, a mobile phone, a personal digital assistant (PDA), or a camera.

The memory system 1000 shown in FIG. 10 may be the memory system 1000, shown in FIG. 1.

The processor 2100 may perform certain calculations or tasks. Accordingly, the processor 2100 may be a microprocessor or a central processing unit (CPU). The processor 2100 may communicate with the RAM 2200, the input/output device 2300, and the memory system 1000 via a bus 2500 such as an address bus, a control bus, and a data bus. In some embodiments of the present inventive concept, the processor 2100 may be connected to an expanded bus such as peripheral component interconnect (PCI) bus.

The RAM 2200 may store data that is used to operate the electronic apparatus 2000. For example, the RAM 2200 may be a dynamic RAM (DRAM), a mobile DRAM, an SRAM, a PRAM, an FRAM, an RRAM, and/or an MRAM.

The input/output device 2300 may include an input unit such as a keyboard, a keypad, or a mouse, and an output unit such as a printer or a display. The power supply device 2400 may supply an operating voltage to operate the electronic apparatus 2000.

Figure 11:
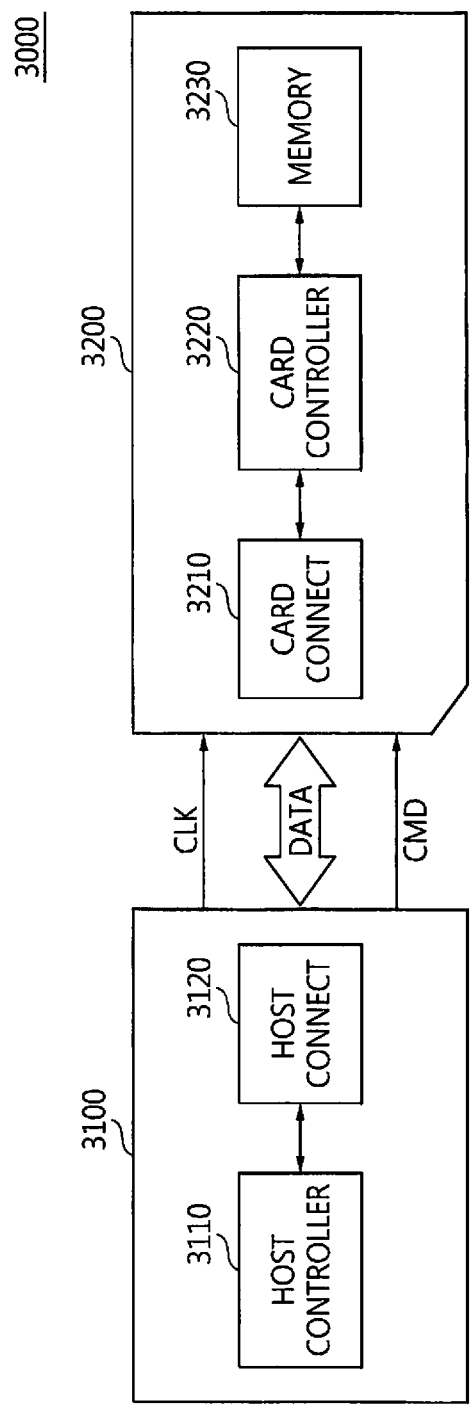
FIG. 11 is a block diagram of a memory card system adopting the memory system according to an example embodiment.

FIG. 11 is a block diagram of a memory card system including a memory system 3000 according to an example embodiment of inventive concepts.

Referring to FIG. 11, the memory card system 3000 may include a host 3100 and a memory card 3200. The host 3100 includes a host controller 3110, and a host interface connecting unit 3120. The memory card 3200 may include a card connecting unit 3210, a card controller 3220, and a memory device 3230.

The card controller 3220 and the memory device 3230 shown in FIG. 11 may be the memory controller 100 and the memory device 200, shown in FIG. 1.

The host 3100 may write data to the memory card 3200, or may read data stored in the memory card 3200. The host controller 3110 may transmit commands CMD, clock signals CLK generated in a clock generator (not shown), and data DATA to the memory card 3200 via the host connecting unit 3120.

The memory card 3200 may be a compact flash card (CFC), a microdrive, a smart media card (SMC), a multi-media card (MMC), a Secure Digital (SD)™ card (SDC), a memory stick, or a USB flash memory drive.

Figure 12:
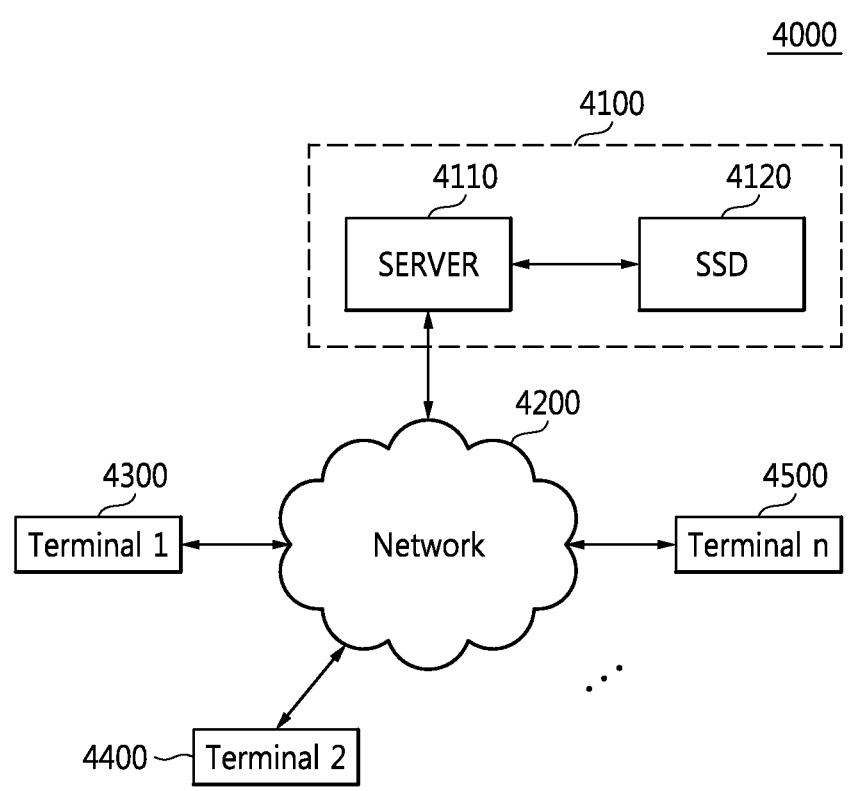
FIG. 12 is a block diagram of an example of configuring a network of a server system including a solid state disk (SSD) according to an example embodiment.

FIG. 12 is a block diagram showing an example of network configuration about a server system 4100 including an SSD according to an example embodiment of inventive concepts.

Referring to FIG. 12, the network system 4000 may include a server system 4100, and a plurality of terminals 4300, 4400, and 4500 connected to each other via a network 4200. The server system 4100 of the present embodiment may include a server 4110 processing requests transmitted from the plurality of terminals 4300, 4400, and 4500 connected to the network 4200, and an SSD 4120 storing data corresponding to the requests transmitted from the terminals 4300, 4400, and 4500. Here, the SSD 4120 may be the memory system 1000, shown in FIG. 1.

Meanwhile, the memory system according to inventive concepts may be mounted by using various types of packages. For example, the memory system according to inventive concepts may be mounted by using packages such as a package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metricquad flat pack (MQFP), thin quad flatpack (TQFP), small outline integrated circuit (SOIC), shrink small outline package (SSOP), thin small outline package (TSOP), thin quad flatpack (TQFP), system in package (SIP), multi-chip package (MCP), wafer-level fabricated package (WFP), and wafer-level processed stack package (WSP).

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. All such modifications are intended to be included within the scope of this disclosure.

What is claimed is:

1. A method of determining a similarity between data units in a nonvolatile memory system, the method comprising:

receiving an incoming data unit;

assigning an incoming index value to the incoming data unit;

dividing the incoming data unit into a plurality of chunks, the incoming data unit represented by a vector of the plurality of chunks;

determining an incoming plurality of hash values of the plurality of chunks based on a hash function;

determining a selected plurality of hash values from the incoming plurality of hash values;

determining a plurality of buckets in a table based on the selected plurality of hash values, each of the plurality of buckets associated with a different one of the selected plurality of hash values;

storing the incoming index value in at least one of the plurality of buckets;

determining a number of buckets in the plurality of buckets storing the incoming index value and at least another index value associated with at least another data unit; and determining a similarity between the incoming data unit and the at least another data unit based on the determined number.

2. The method of claim 1, wherein the incoming data unit is one of a sector and a page.

3. The method of claim 2, wherein a number of the plurality of chunks is the number of cells in a sector divided by an average size of the plurality of chunks.

4. The method of claim 1, wherein the selected plurality of hash values includes all of the incoming plurality of hash values.

5. The method of claim 1, wherein the determining of the selected plurality of hash values includes,
determining a first possible value for the hash function;
determining a threshold based on a product of the first possible value and a constant factor; and
determining the selected plurality of hash values based on the incoming plurality of hash values that exceed the threshold.

6. The method of claim 1, wherein the determining of the similarity determines the similarity based on whether the determined number exceeds a threshold number.

7. The method of claim 6, wherein the threshold number is one.

8. The method of claim 1, further comprising:
writing the incoming data unit into a physical page of a nonvolatile memory based on the similarity, the writing including,
writing a reference page having different chunks of the plurality of chunks, and
writing a difference between the incoming data unit and the at least another data unit.

9. The method of claim 1, wherein the nonvolatile memory is a flash device.

10. The method of claim 9, wherein the flash device is a NAND flash device.

11. The method of claim 1, wherein the determining of the similarity determines the similarity independent of positions of the plurality of chunks in the incoming data unit.

12. The method of claim 1, wherein the plurality of chunks are non-overlapping.

13. A memory system comprising:
a nonvolatile memory device; and
a memory controller configured to,
receive an incoming data unit,
assign an incoming index value to the incoming data unit,
divide the incoming data unit into a plurality of chunks, the incoming data unit represented by a vector of the plurality of chunks,
determine an incoming plurality of hash values of the plurality of chunks based on a hash function,
determine a selected plurality of hash values from the incoming plurality of hash values,
determine a plurality of buckets in a table based on the selected plurality of hash values, each of the plurality of buckets associated with a different one of the selected plurality of hash values,
store the incoming index value in at least one of the plurality of buckets,
determine a number of buckets in the plurality of buckets storing the incoming index value and at least another index value associated with at least another data unit, and
determine a similarity between the incoming data unit and the at least another data unit based on the determined number.

14. The memory system of claim 13, wherein the incoming data unit is one of a sector and a page, and
the number of the plurality of chunks is the number of cells in a sector divided by an average size of the plurality of chunks.

* * * * *